(12) United States Patent
Converse (10) Patent No.: US 10,503,132 B2
(45) Date of Patent: Dec. 10, 2019

(54) LOAD DISTRIBUTION FOR DISSIMILAR GENERATOR SETS

(71) Applicant: Caterpillar Inc., Peoria, IL (US)

(72) Inventor: Perry D. Converse, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 797 days.

(21) Appl. No.: 14/792,275

(22) Filed: Jul. 6, 2015

(65) Prior Publication Data

US 2017/0012440 A1 Jan. 12, 2017

(51) Int. Cl.
*G05B 19/042* (2006.01)
*H02J 3/38* (2006.01)
*H02J 3/48* (2006.01)

(52) U.S. Cl.
CPC .............. *G05B 19/042* (2013.01); *H02J 3/38* (2013.01); *H02J 3/48* (2013.01); *G05B 2219/2639* (2013.01); *Y02B 70/3241* (2013.01); *Y04S 20/227* (2013.01)

(58) Field of Classification Search
CPC .. H02J 3/48; H02J 3/38; G05B 19/042; G05B 2219/2639
USPC ........................................................ 700/295
See application file for complete search history.

(56) References Cited

U.S. PATENT DOCUMENTS

| | | |
|---|---|---|
| 4,258,522 A | 3/1981 | Ryker et al. |
| 4,305,129 A * | 12/1981 | Yannone .................. H02J 3/48 290/40 R |
| 4,514,642 A * | 4/1985 | Ross ..................... F22B 35/008 290/40 A |
| 7,410,021 B1 | 8/2008 | Belloso |
| 7,792,626 B2 | 9/2010 | Eriksson et al. |
| 8,695,566 B2 | 4/2014 | Kawaguchi et al. |
| 8,841,787 B1 | 9/2014 | Folken et al. |
| 9,062,616 B2 | 6/2015 | Zhang et al. |
| 2010/0102637 A1 | 4/2010 | Dozier et al. |
| 2010/0156191 A1 | 6/2010 | Dozier et al. |
| 2011/0062708 A1* | 3/2011 | Prochaska ............... F02D 29/06 290/7 |
| 2011/0148214 A1* | 6/2011 | Dahlen ..................... H02J 3/40 307/87 |
| 2011/0320053 A1* | 12/2011 | Dozier ..................... H02J 3/38 700/287 |
| 2012/0249022 A1 | 10/2012 | Wasburn et al. |
| 2014/0097683 A1* | 4/2014 | Piyabongkarn ........... H02J 3/32 307/26 |

(Continued)

*Primary Examiner* — Thomas C Lee
*Assistant Examiner* — Anzuman Sharmin
(74) *Attorney, Agent, or Firm* — Leydig, Voit & Mayer, Ltd.

(57) ABSTRACT

An electrical power system includes a plurality of generator sets (gensets) having different response capabilities which are connected to a common bus that is coupled to an electrical load. The gensets may be operatively associated with one or more electronic controllers. Each genset has an operational range applied to it and a power target set for it. In the event of a change in the power demand by the electrical load, the operational ranges and the power target setting are changed according to the response capabilities of the individual gensets. To facilitate the change, the faster responding genset can operate intermittently according to various methods to generate additional power to compensate for the power deficiency of the slower responding genset as it adjusts to its changed settings.

20 Claims, 7 Drawing Sheets

(56) References Cited

U.S. PATENT DOCUMENTS

| | | | |
|---|---|---|---|
| 2014/0139027 A1* | 5/2014 | Nguyen | H02J 3/48 |
| | | | 307/52 |
| 2014/0152006 A1 | 6/2014 | Sterregaard et al. | |
| 2014/0152007 A1 | 6/2014 | Sterregaard et al. | |
| 2014/0265354 A1 | 9/2014 | Folken et al. | |

* cited by examiner

LOAD DISTRIBUTION FOR DISSIMILAR GENERATOR SETS

TECHNICAL FIELD

This patent disclosure relates generally to a plurality of generator sets arranged together to generate electrical power for an electrical load and, more particularly, to a method and strategy for accommodating changes in electrical load across the plurality of generator sets.

BACKGROUND

One manner of generating electrical power in the form of alternating current to provide electrical power for an electrical load, especially when connection to a larger electrical power grid supported by utilities is not be readily available (i.e. "off-grid"), is to utilize a generator set, or genset for short. A genset includes in combination a prime mover and an electrical generator or alternator. The prime mover may be a mechanical engine such as an internal combustion engine (e.g., a diesel compression ignition engine) or gas turbine in which a hydrocarbon-based fuel and air is combusted to release the chemical energy therein and to convert that energy into a mechanical or motive force. The motive force, in turn, is used to rotate a rotor relative to a stator of the generator so that a magnetic field produced by one component induces electrical current in the field windings associated with the other component. The generated electricity is used to power electrical equipment, i.e., the electrical load connected with the genset via an electrical network or circuit.

The genset may output electrical power as alternating current measured in watts or kilowatts, with the quantity of power generated being determined as the product of the current produced by the electrical generator with the potential or voltage across the genset. If possible, the genset is operated below its rated capacity to avoid wasting fuel. Occasionally, however, the power demand may be larger than can be supplied by a single genset. In such instances, multiple gensets may be operated together in a parallel arrangement to jointly meet the power demand. With arrangements of multiple gensets, especially when isolated from a larger electrical grid that could dictate their operation, it is necessary to distribute the electrical load among the plurality and to synchronize their operation to match the speed and frequency with the frequency of the electrical load. One method of distributing electrical load among a plurality of gensets is symmetric load sharing, in which the load is distributed proportionally according to the rated capacity or rated output of each genset. Hence, the gensets are all being operated at the same percentage of their individual, relative capacity, and theoretically should be subjected to the same level of stress and wear, even though some gensets may be producing a larger absolute output than other gensets.

While symmetrical loading may address load distribution and synchronization with respect to the electrical characteristics of the plurality of gensets, it might not necessarily account for efficiencies and other considerations associated with the prime mover portion of the genset. For example, the prime mover, such as an internal combustion engine, may operate at peak fuel efficiency, as determined by a torque-fuel curve, that may not correlate with the output of the genset being requested by the symmetric load sharing arrangement. Other considerations that may not be accounted for include emissions from the prime mover. To address considerations associated with the prime mover, another technique for allocating the power demand among multiple gensets is asymmetric loading. An example of asymmetric loading or load sharing is described in U.S. Publication No. 2014/0152006 ("the '006 publication") in which an efficiency database with fuel efficiency data is consulted when allocating power demand among gensets. With asymmetric load sharing, operation of the gensets may not be directly proportional and may occur with a degree of independence between gensets.

Under either the symmetrical or asymmetrical loading method, it is necessary to accommodate fluctuations or changes in the power demanded by the electrical load, which may increase or decrease as devices are switched on and off. The changes in power demand may occur rapidly and dynamically. Accounting for these changes is complicated by the fact that different gensets in the plurality may have different operating characteristics and are provided in different output capacities and sizes. The present disclosure is directed to addressing these considerations.

SUMMARY

In one aspect of the disclosure, an electrical power system for providing power to an electrical load is described. The electrical power system may include a common bus coupled with an electrical load, a first genset having a first power capacity limit connected to the common bus, and a second genset having a second power capacity limit connected to the common bus. The first genset is associated with a first response capability to changes in the electrical load and the second genset is associated with a second response capability to changes in the electrical load; the second response capability being relatively slower than the first response capability. The electrical power system further includes an electronic controller configured to apply a first operational range to the first genset and to apply a second operational range to the second genset in response to changes in the electrical load. Also in response to changes in the electrical load, the electronic controller further determines a first power target within the first operational range and a second power target within the second operational range. The electronic controller can then set the first power target in accordance with the first response capability and the second power target in accordance with the second response capability.

According to another aspect, the disclosure describes a method for operating a plurality of gensets. To apply the method, a first genset having a first power capacity limit and a second genset having a second power capacity limit are connected to an electrical load. The first genset may be associated with a first response capability to changes in the electrical load that is faster than a second response capability associated with the second genset. The method applies a first operational range to a first genset and sets a first power target within the first operational range. The method further applies a second operational range to the second genset and sets a second power target within the second operational range. In response to a power request increase from the electrical load, the method raises the first operational range within the first power capacity limit and raises the second operational range within the second power capacity limit. After raising the operational power ranges, the method sets the first power target according to the first response capability and sets the second power target according to the second response capability.

In yet another aspect, the disclosure describes an electrical power system including a first genset with a first power capacity limit and a second genset having a second power capacity limit. The first and second gensets are able to operate within the respective first and second power capacity limits. The first and second genset are connected to a common bus in a parallel arrangement that in turn is coupled with an electrical load. The electrical power system includes an electronic controller communicating with the first genset and the second genset to allocate a power request from the electrical load. The power request is allocated to the first genset as a first power target within a first operational range and to the second genset as a second power target within a second operational range. The electronic controller is configured to raise the first operational range and the second operational range in the event of an increase to the power request from the electrical load. The electronic controller is further configured to raise the first power target within the first power capacity limit while attempting to raise a second power target within the second operational range.

DETAILED DESCRIPTION

Figure 1:
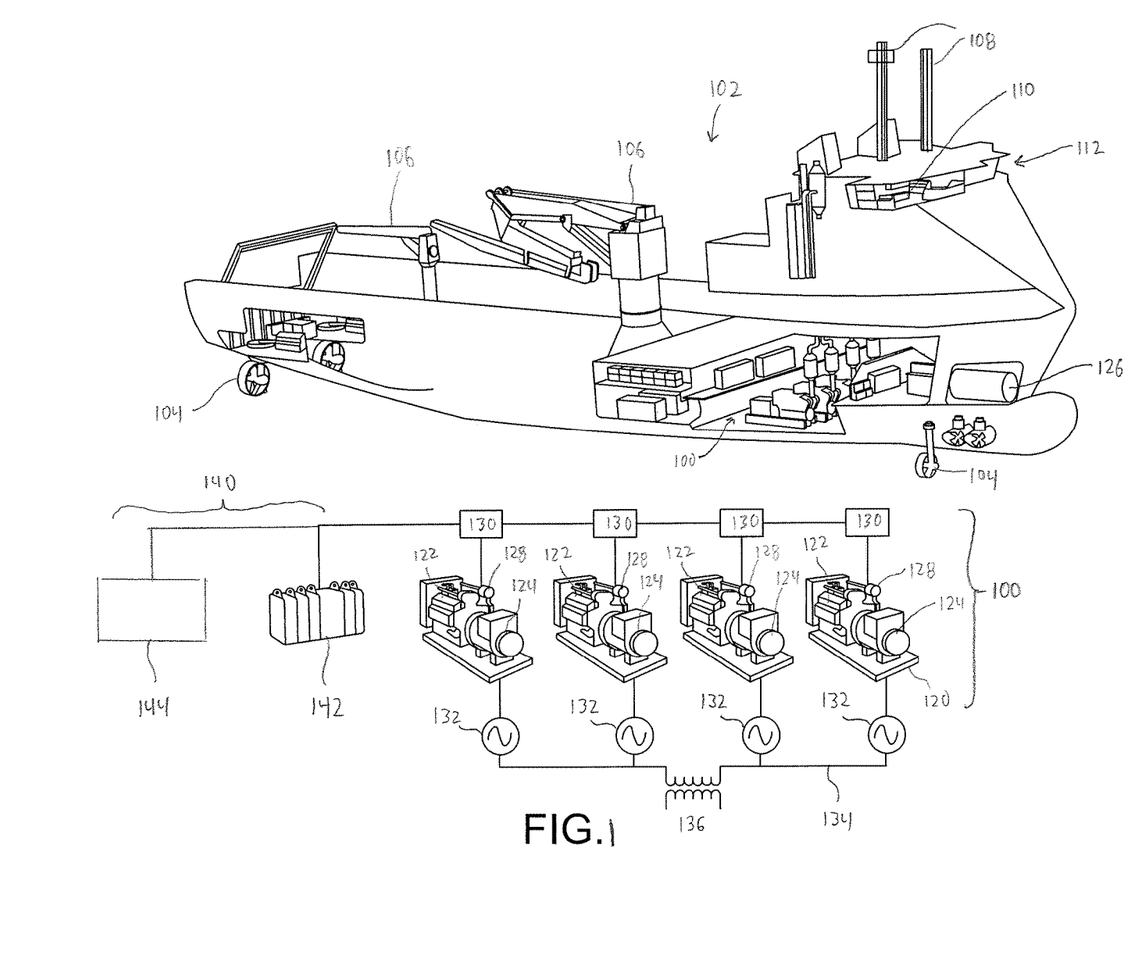
FIG. 1 is a schematic illustration of a marine vessel having a plurality of generator sets (gensets) to generate electrical power for the electrical requirements or load of the vessel, and various electronic controllers for regulating operation of the gensets.

This disclosure relates to an electrical power system including a plurality of generator sets (gensets) for generating electrical power, specifically alternating current, and the methods and electronic or digital controllers for regulating cooperative operation of the gensets. Now referring to the drawings, wherein like reference numbers refer to like elements, there is illustrated in FIG. 1 an electrical power system 100 that may be arranged to generate electric power for an isolated electrical load such as, for example, the electrical requirements of a marine vessel 102 like a freighter or cargo ship as shown. In particular, the electrical power system 100 may generate electrical power for the propulsion units 104 of the marine vessel, which may be a plurality of azimuth thrusters. Azimuth thrusters are electrically driven units that can independently rotate with respect to the hull of the marine vessel, eliminating the need for a rudder. The azimuth thrusters are powered by electricity generated by the electrical power system 100 rather than being directly driven by a power unit such as an engine, reactor, or boiler. In addition to the propulsion units 104, the electrical requirements of the marine vessel may include motorized cranes 106 for lifting and moving freight, communication equipment 108 for communicating with shore and other marine vessels, and navigation controls 110 that may be disposed in the bridge 112 of the marine vessel for directing movement and operation of the marine vessel. These devices and components make up the electrical load of the marine vessel 102.

As can be appreciated, the marine vessel 102 is electrically isolated from a larger power grid, such as those supplied by utilities, and therefore includes the independent electrical power system 100 to provide for its electrical power needs. The independent, "off-grid" electrical power system 100 may be referred to as an isolated system or an island. Other marine applications for the isolated electrical power system 100, in addition to the illustrated freighter, include military vessels, passenger liners, tankers, and the like. In addition to being utilized for marine vessels 102, the independent electrical power system 100 described herein may be utilized for oil or gas procuring applications, temporary military bases, or any other electrical application where electrical power from a utility-supplied power grid is not readily available or may be interrupted. Hence, a characteristic of the electrical power system 100 described herein is that it can operate independently of a larger electrical grid in which electrical power is supplied by other sources, such as power plants, nuclear reactors, hydroelectric dams, and the like.

To generate electrical power, the electrical power system 100 includes a plurality of generator sets 120, or gensets, which operate in cooperation with each other. In particular, each genset 120 includes a prime mover 122, such as an internal combustion engine and, more particularly, a diesel compression ignition engine, and an electrical generator 124 or alternator coupled to the prime mover. The prime mover 122 can combust hydrocarbon fuel and air to produce a mechanical force or motive power that rotates a magnetic field in the electrical generator 124 that is converted to electrical power. To provide fuel for the prime mover 122 to combust, the electrical power system 100 may be operably associated with one or more fuel tanks 126 or reservoirs. To control the rate or quantity of fuel combusted, and hence the speed and/or torque produced by the prime mover 122, a governor 128 may be operably associated with the prime movers. In addition to the example of an internal combustion engine, other variations of prime movers 122 include gas combustion turbines, rotary engines, reactors, steam boilers, and the like. While the electrical capacity of the gensets 120 described herein may be rated at any suitable size, an exemplary genset may produce several kilowatts and the combination of the gensets may together produce several hundred kilowatts. To regulate operation of the prime mover 122 and the electrical generators 124 of the individual gensets 120, each genset may include an electronic genset controller 130 that may be a computing device capable of performing typical computing and digital processing functions.

The electrical power generated by the electrical generators 124 of the gensets 120 may be in the form of alternating current, or AC electricity, where voltage and the flow of current periodically changes direction, in contrast to direct current, or DC electricity. The phase change, or shift in direction of the alternating current, may produce current and voltage in accordance with a cycling waveform, in particular, a sinusoidal waveform in which the amplitude of the current and voltage periodically and repetitively changes from a positive value to an equal negative value and back to the positive value. Hence, each of the gensets 120 is shown as generating an alternating current waveform 132. To combine the electrical current being generated, the plurality of gensets 120 may be electrically connected to a common bus 134 or busbar in a parallel arrangement. In a parallel arrangement, the total current generated by the electrical power system 100 is the sum of the individual currents generated by each of the plurality of gensets 120 while the potential or voltage is generally the same across each of the gensets. The common bus 134 can be electrically connected through a network or circuit with the electrical equipment of the marine vessel 102, considered together to make up the electrical load 136 of the vessel. The plurality of cooperating gensets 120 making up the electrical power system 100 functions as the power source for the electrical load 136 of the vessel.

Because the plurality of gensets 120 are connected to the common bus 134, it is necessary to synchronize their alternating current output to match the frequency, voltage, and phase angle of the alternating current waveform 132 between the individual gensets. To synchronize the plurality of gensets 120, the gensets may be operatively associated with and in electronic communication with one or more electronic controllers 140 that regulate operation of the electrical power system 100. The electronic controllers 140 may include a processor, an application specific integrated circuit (ASIC), or other appropriate circuitry for performing logic and digital functions, and may have associated memory or similar data storage capabilities. The memory may store software instructions, computer programs, and data in the form of maps, tables, and databases that include parameters and operating conditions about the components of the electrical power system 100. The electronic controllers may be discrete, individual units, or their functions may be distributed over a plurality of distinct components. The electronic controllers may operate and communicate with each other and with other components of the electrical power system 100 using digital signals, analog signals, or through any other suitable means. The electronic controllers may communicate with each other through wired connections or may communicate wirelessly through radio frequency or wi-fi mediums. The communications may involve sending and receiving signals reflecting measured data and variables, directions, controls, and requests.

Although in some embodiments the electronic controllers 140 may operate the plurality of gensets 120 according to a symmetrical load sharing method, in other embodiments the present disclosure may be configured to implement an asymmetrical load sharing method to account for considerations such as fuel efficiency and emissions associated with the prime movers. To perform the asymmetrical load sharing method, a multi-engine optimizer (MEO) controller 142 may be included among the plurality of controllers 140 that is specifically configured to balance and synchronize the electrical load among the gensets while, in part, addressing the considerations associated with prime movers. The MEO controller 142 may receive or retrieve from memory information regarding the fuel efficiencies of the prime movers 122, torque-fuel curves associated with the prime movers 122, emissions constraints on the electrical power system 100, and the like. The MEO controller may further process that information with the total power demand requested by the electrical load 136 and with electrical characteristics or parameters of the electrical generators 124, like rated capacity, power factors, and the generator synchronization constraints, to optimize a per genset load share, which may be measured in kilowatts. The MEO controller 142 can direct the individual genset controllers 130 to operate the respective gensets 120 to produce a respective share of the total power demand.

In particular, in accordance with the asymmetrical load sharing method, the MEO controller may direct each genset to generate power below its rated capacity and which is not necessarily proportional to the output of the other gensets. For example, referring to FIG. 2, there is illustrated a representation of a particular genset 200 having a power capacity 202 that is limited by a power capacity limit 203, measured in kilowatts, and having the ability to generate electrical power within the power capacity limit. The MEO controller may determine an operational range 204 to be applied to the particular genset 200 in which it may operate to provide its share of the total power demand from the electrical load. The operational range 204 may be characterized by an upper threshold 206 and a lower threshold 208 that constrain operation of the particular genset 200 for the prevailing conditions and load. The operational range 204 may be determined in accordance with the electrical requirements imposed on the particular genset 200, such as synchronization requirements and the like. Moreover, to determine the specific output the particular genset 200 is to generate, the MEO controller can set a power target 210 within the operational range 204. The power target 210 may correspond to the optimized output for the particular genset 200 within the operational range 204 as determined based on considerations associated with the prime mover, such as fuel efficiency or emissions.

Figure 2:
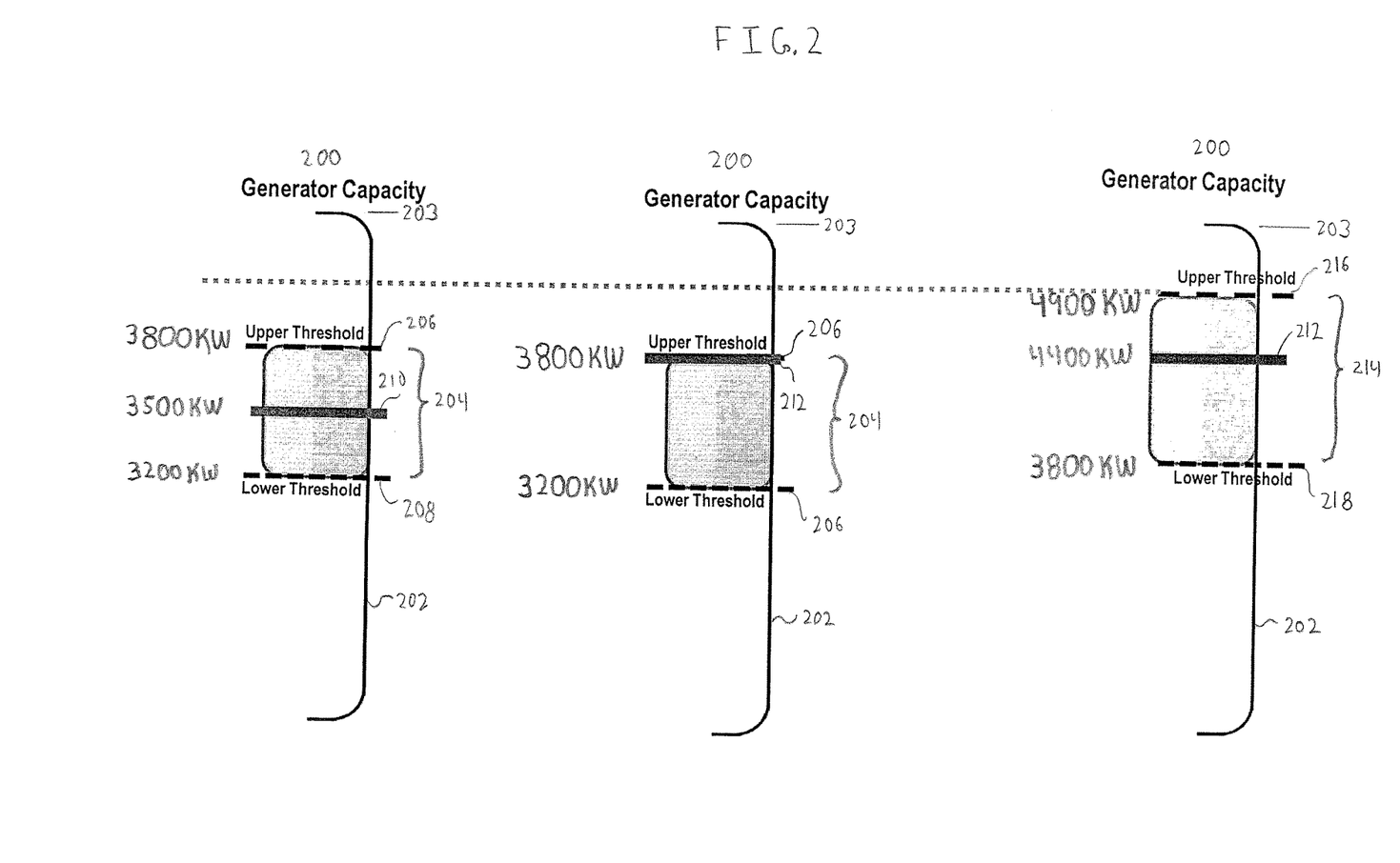
FIG. 2 is a schematic representation of a genset represented by its power capacity with an operational range being applied to the capacity, and a power target set within the operational range.

By way of example, for a particular genset 200 having maximum power capacity limit 203 of 5000 KW, the MEO controller may apply an operational range 204 of 600 KW with an upper threshold 206 of 3800 KW and a lower threshold 208 of 3200 KW for the prevailing conditions. The MEO controller may determine and set an optimal power target 210 of 3500 KW within the operational range 204, and direct the particular genset 200 to generate 3500 KW of power corresponding to the power target. Further, the power target 210 of 3500 KW may correspond to the best fuel efficiency for the particular genset 200 within the applied operational range 204 or a similar consideration.

As explained above, the power demanded by the electrical load may change as devices are electrically connected into and removed from the network. In the event of a change to the electrical load, the power target may be moved within the operational range 204 to meet the changed load. For example, referring to FIG. 2, the power target 210 optimally set at 3500 KW may move to a new power target 212 to accommodate the increased demand that, in the illustrated embodiment, may correspond to the upper threshold 206 of the operational range 204, or 3800 KW. Although the new power target 212 may not correspond to the optimal setting for the particular genset 200 with respect to fuel efficiency or the like, it may still meet the synchronization requirements or electrical constraints established by the operational range 204. However, the change in power demand from the electrical load may be such that the new power target 212 exceeds the operational range 204 as determined for the prevailing conditions.

To accommodate this significant increase or change, referring back to FIG. 1, the electrical power system 100 can also include a dynamic load controller 144 among the electronic controllers 140. The dynamic load controller 144 can communicate with the MEO controller 142 and with the individual genset controllers 130. While the dynamic load controller 144 is illustrated as a separate unit from the MEO controller, it will be appreciated that in other embodiments, the dynamic load controller and MEO controller can be implemented on the same computer equipment and with the other controllers 140 associated with the electrical power system 100. The dynamic load controller 144 can process and execute functions and algorithms to accommodate the dynamic and changing power demands associated with the electrical load. For example, referring to FIG. 2, the dynamic load controller may raise the initial operational range 204 to a new operational range 214 to accommodate the increased demand. The new operational range 214 may be recalibrated to account for synchronization and other requirements of the genset corresponding to the setting of the new power target 212.

In an aspect, the dynamic controller may increase the size of the new operational range 214 to better accommodate dynamic changes in the load, such that the new operational range may have an upper threshold 216 of 4900 KW and a lower threshold 218 of 3800 KW. Thus, the new operational range 214 may be dynamic or flexible. Hence, when the dynamic range controller raises or lowers the operational range, it may quantitatively adjust the size of the range as well. The new operational range 214 may be applied to the particular genset 200 so that the new power target 212 of, for example, 4400 KW falls within the range. The quantitative adjustments can be predetermined by experimentation and can increase or decrease as the operational range 204 is raised or lowered with respect to the power capacity 202 of the particular genset. In other embodiments, the operational ranges may be static or may be determined as a fixed percentages that may increase or decrease in a lock-step manner as power demand increases or decreases. Any other suitable method may be used to determine the ranges. The new power target 212 further may be optimized to correspond to the best fuel efficiency for the new operational range 214 as well.

In addition to dynamically adjusting a particular genset, the dynamic load controller may be configured to dynamically adjust a plurality of gensets operating together in parallel as part of an isolated electrical power system or island. For example, referring to FIG. 3, there is illustrated a plurality of gensets including a first genset 220, a second genset 240, a third genset 260, and a fourth genset 280, operating in parallel at a first instance 298 and at a second instance 299. The gensets may have different physical sizes within the arrangement and therefore have different power capacities, which may be directly related to size. For example, the first genset 220 and the second genset 240 may have a respective first power capacity 222 and a second power capacity 242 that are equal and that are capped at a respective first and second power capacity limit 223, 243 of 5000 KW. The third genset 260 and the fourth genset 280 may be physically smaller in size, therefore having a respective third power capacity 262 and fourth power capacity 282 that are limited at the third and fourth power capacity limits 263, 283 of 4000 KW, respectively.

Figure 3:
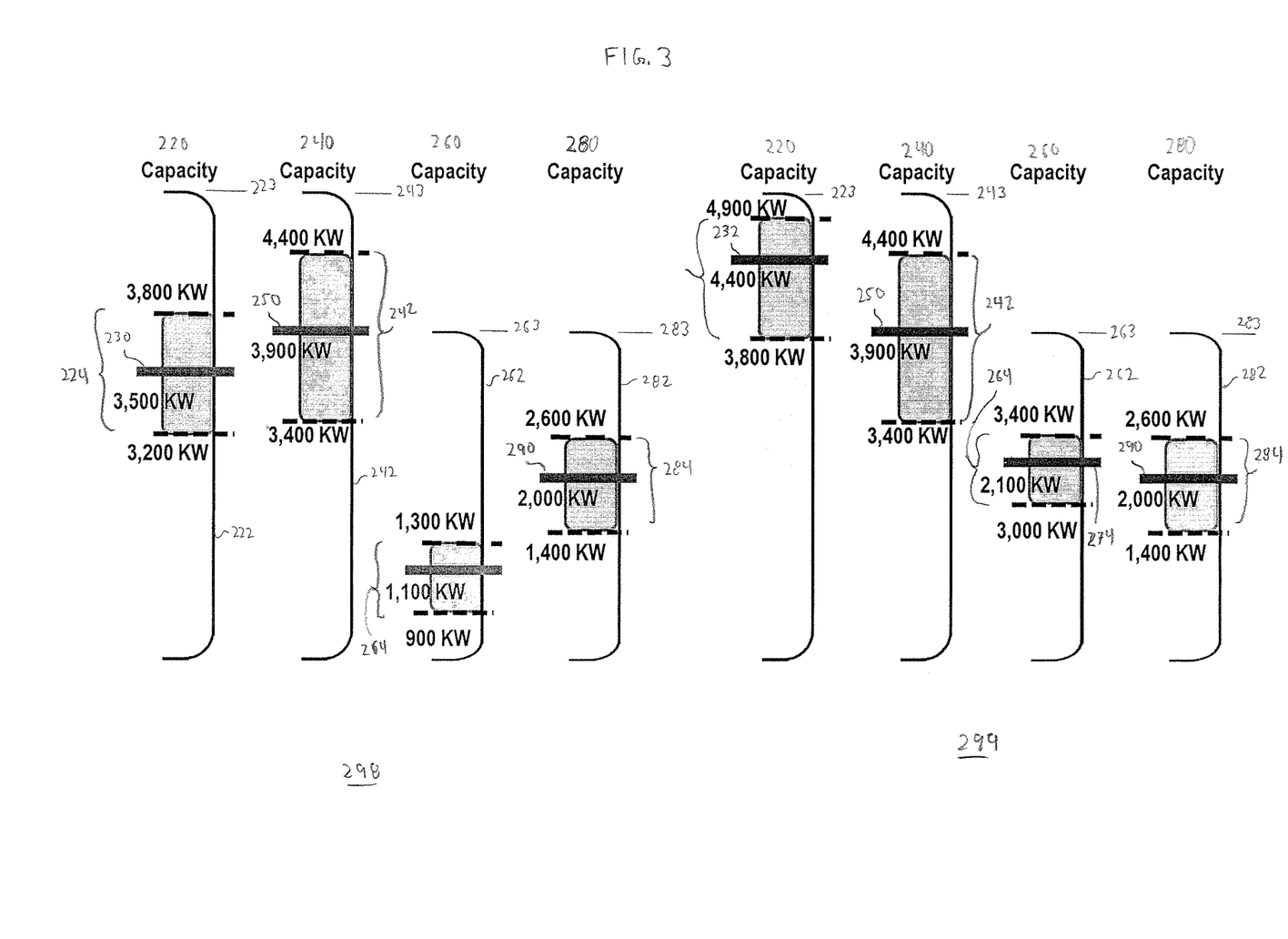
FIG. 3 is a schematic representation of a plurality of gensets represented by their power capacities with operational ranges and power targets being adjusted in response to a change in power demand from an electrical load according to an asymmetrical loading method.

In addition to the different physical sizes and rated power capacity limits, the dynamic load controller may apply different operational ranges and set different power targets for the plurality of gensets in accordance with the asymmetrical loading method. For example, the first genset 220 may be under a first operational range 224 between 3200 KW and 3800 KW with a set first power target 250 of 3500 KW while the second genset 240 may be under a second operational range 244 between 3400 KW and 4400 KW with a set second power target of 3900 KW, even though the first and second gensets have the same physical size and power capacities 222, 242. The different operational ranges may reflect different load allocations from the asymmetrical loading method performed by the MEO controller based on synchronization requirements and/or efficiency considerations. Likewise, the third genset 260 may have a third operational range 264 and set a third power target 270 different than the fourth operational range 284 and fourth set power target 290 associated with the fourth genset 280, even though they are similarly sized and have similar power capacities 262, 282.

In an embodiment, when the power demanded by the electrical load changes, the dynamic load controller can adjust some or all of the plurality of gensets in any suitable combination and to any suitable outputs to optimally generate electrical power. For example, in the event the power demand of the electrical load increases by 3000 kilowatts, the dynamic load controller needs to allocate the additional 1900 KW among the plurality of gensets. Rather than raise the four gensets each proportionally by 450 KW, the dynamic load controller may adjust just the first and third gensets 220, 260 while maintaining the second and fourth gensets 240, 280 at their original ranges and settings. In particular, the dynamic load controller may apply a new operational range 234 to the first genset of between about 4900 KW and 3800 KW with a new set power target 232 of 4400 KW to the first genset 220. Further, the third genset 260 may operate with a new operational range 264 of between 3400 KW and 3000 KW with a new raised power target 272 of 2100 KW. Hence, the outputs of the plurality of gensets is increased by 1900 KW by only adjusting the first and second gensets 220, 260 while maintaining the set second and fourth power targets 250, 290 of the second and fourth gensets 240, 280 at their initial values.

In the example above, the first and third gensets 220, 260 have different power capacities 222, 262 corresponding to their different physical sizes. The physical dissimilarities between the gensets may result in the gensets having different response characteristics or reactions to the adjustments being directed by the dynamic load controller. For example, it may take longer for the prime mover associated with the larger capacity genset to increase its torque output due to inertia associated with the mechanical components like pistons, turbines, and such, to meet the allocated increase in power output. It may require a larger quantity of fuel to be introduced to the larger prime mover, thereby increasing the response time of the higher capacity genset. Alternatively, the governors associated with smaller gensets may be insufficiently sized and throttle or restrict their prime movers. Hence, the different gensets may have different response capabilities associated with them. The response capabilities typically are measured in time but may be quantified according to other suitable values as well.

Figure 4:
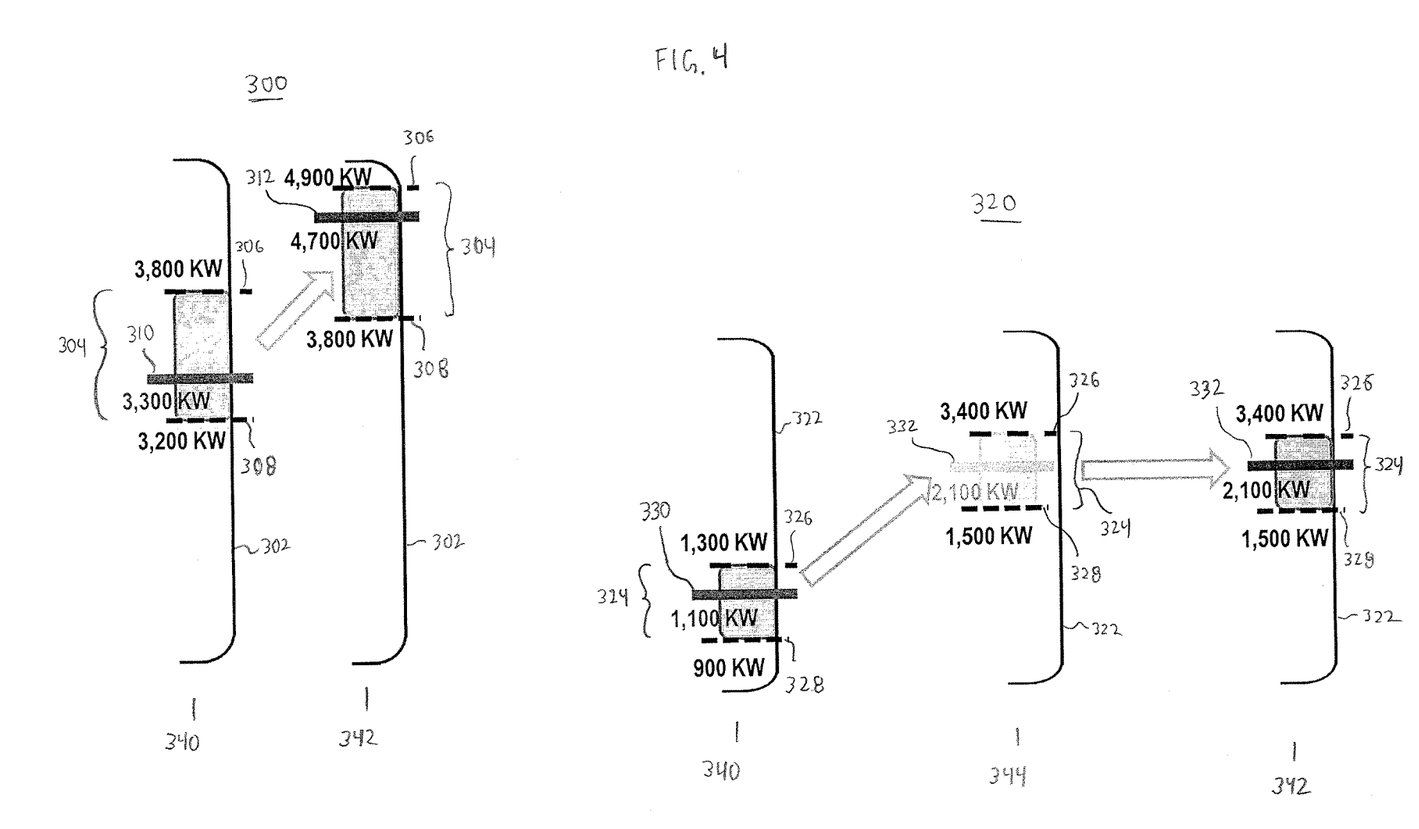
FIG. 4 is a schematic representation of one embodiment of a method for distributing the electrical load among a plurality of gensets having different characteristics when the power demanded by the electrical load changes.

To accommodate the dissimilar response capabilities of the different gensets, the dynamic load controller may implement different control strategies when the power demanded by the electrical load changes. For example, FIG. 4 represents schematically a first genset 300 having a first response capability and a second genset 320 having a second response capability. The first response capability may be relatively slower and the second response capability may be relatively faster. The different response capabilities may result from the differences between the first power capacity 302 of the first genset 300 and the second power capacity 322 of the second genset 320 due to their relative sizes. The difference may be only a few seconds, but considering the speed and frequencies at which the plurality of gensets operate, it may still be of significance. At an initial temporal instance, indicated by reference number 340, the dynamic load controller may be applying an operational range 304 between an upper threshold 306 of 3800 KW and a lower threshold 308 of 3200 KW to the first genset 300 while setting an initial power target 310 of 3300 KW. At the same instance 340, the second genset 320 may have an applied operational range 324 between an upper threshold 326 and lower threshold 328, corresponding to 1300 KW and 900 KW respectively, with a set power target 330 of 1100 KW. The differences in power settings and proportionality reflect the different load allocations produced by the asymmetrical load sharing arrangement based on the considerations processed therein.

If the power demand associated with the electrical load increases by, for example, 2400 KW, the dynamic load controller associated with the plurality of gensets may decide to raise the target output of the first and second gensets 300, 320 in a non-proportional manner, for example, by 1400 KW and 1000 KW respectively. In particular, the first operational range 304 associated with the first genset 300 may be raised so that the upper threshold 306 corresponds to 3800 KW and the lower threshold 308 corresponds to 3800 KW at a final temporal instance 342 occurring later than the initial temporal instance 340. The raised first power target 312 may be set to 4700 KW, safely within the first operational range 304 as raised. Likewise, the dynamic load controller can raise the second operational range 324 of the second genset 320 so the upper threshold 336 corresponds to 3400 KW and the lower threshold 338 corresponds to 1500 KW. The raised second operational range 324 can accommodate the raised second power target 332, as raised to increase the power output of the second genset 320. Because of the quicker response capability of the second genset 320, though, raising the second operational range 324 may occur quicker and be completed at an intermediate temporal instant 344 between the initial temporal instant 340 and final temporal instant 342. The dynamic load controller may address the temporal differences caused by the slower and faster response capabilities with different methods.

According to one method, referring to FIG. 4, the dynamic load controller can have the second genset 320 maintain the raised second operational range 324 and the new setting for the raised second power target 332 from the intermediate temporal instant 344 until the first genset set 300 completely responds to the new directions from the controller at the final temporal instant 342. In other words, the second genset 320 is allowed to respond to the raised second operational range 324 and raised second power target 332 according to its faster response capability. The first genset 300 achieves its raised operational range 304 and raised power target 312 according to its slower response time, meaning the power output of the first genset falls behind the second genset. Because the power of the first genset 300 is still below its new setting by the time the second genset 320 achieves is fully raised power target 332, the two gensets operating in parallel may not generate sufficient power to meet the increased demand from the electrical load.

To accommodate this discrepancy in load, referring back to FIG. 1, the dynamic load controller 144 may operate the faster gensets 120 of the plurality in a droop mode or droop condition during this time. In droop mode, the genset controller 130 associated with the faster genset is made to sense a drop in frequency of its electrical output, for example, by raising a frequency setting it has been programmed to maintain. Hence, the frequency setting may be larger than the actual frequency at which the electrical generator 124 is actually operating. The genset controller 130 will compensate by opening the governor 128 associated with the prime mover 122 to increase the quantity and/or rate of fuel introduced and combusted in order to raise the speed of the prime mover and thus the frequency of the coupled electrical generator 124. However, because the frequency of the electrical generator 124 is synchronized to the prevailing frequency on the common bus 134, the generator will counter the attempt by the prime mover to increase its speed despite the increased fuel intake from the opened governor 128. Combustion of additional fuel therefore increases the torque output of the prime mover 122, meaning the electrical generator 124 can take on additional load. In the electrical power system 100 shown, the additional load may be transferred, or shed, from a slower responding genset connected to the common bus 134 that is still adjusting to the increased power demand from the electrical load 136, i.e., the slower first genset 300 of FIG. 4. Hence, droop mode is a way of temporarily transferring load allocations between parallel gensets. Referring back to FIG. 4, the droop mode of the second genset 320 may prevail until the final temporal instant 342 when the first genset 300 achieves the raised first operational range 304 and the raised first power target 312.

Figure 5:
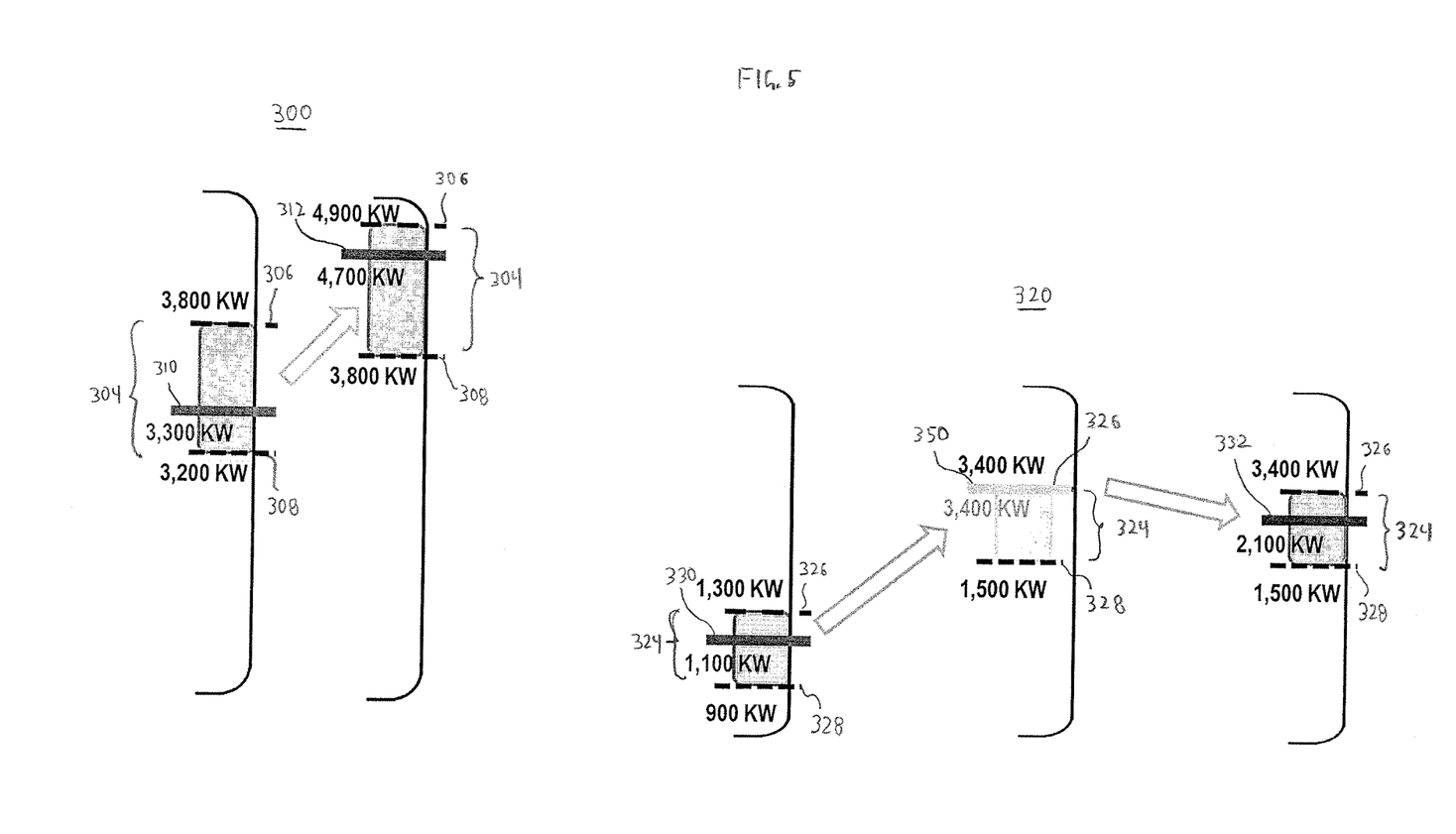
FIG. 5 is a schematic representation of another embodiment of a method for distributing the electrical load among a plurality of gensets when the power demanded by the electrical load changes.

In a second method to address the different response times, represented by FIG. 5, the dynamic power controller may operate the faster, second genset 320 at an interim condition in which it produces additional power measured in kilowatts during the intermediate temporal instant 344. In particular, in the interim condition, the second operational range 304 may be raised as before, with the upper threshold 306 corresponding to 3400 KW and the lower threshold 308 corresponding to 1500 KW as applied by the dynamic load controller. However, the dynamic load controller may raise the power target to a higher or greater setting than the raised power target 312 would be set for optimal generation. For example, the new second power target 350 may correspond to the upper threshold 326 of the second operational range so that the specific output of the second genset 320 during the intermediate temporal instance 344 corresponds to 3400 KW.

The new second power target 350 may not be optimal, as determined by the MEO controller, such that it may not correspond to the best fuel efficiency of the second genset or it may produce excess emissions. But the new second power target 350 may generate sufficient additional power to temporarily compensate for the power deficiency from the first genset 300 while it attempts to raise its first operational range 304 and its first power target 312. To return the second genset 320 to optimal operation, the dynamic power controller can lower the new second power target 350 to the setting for the raised second power target 332 after the first genset 300 fully raises its first operational range 304 and first power target 312 by the final instance 342. In various embodiments, the second genset 320 may be operated under droop mode during the interim condition to provide additional load sharing if necessary.

Figure 6:
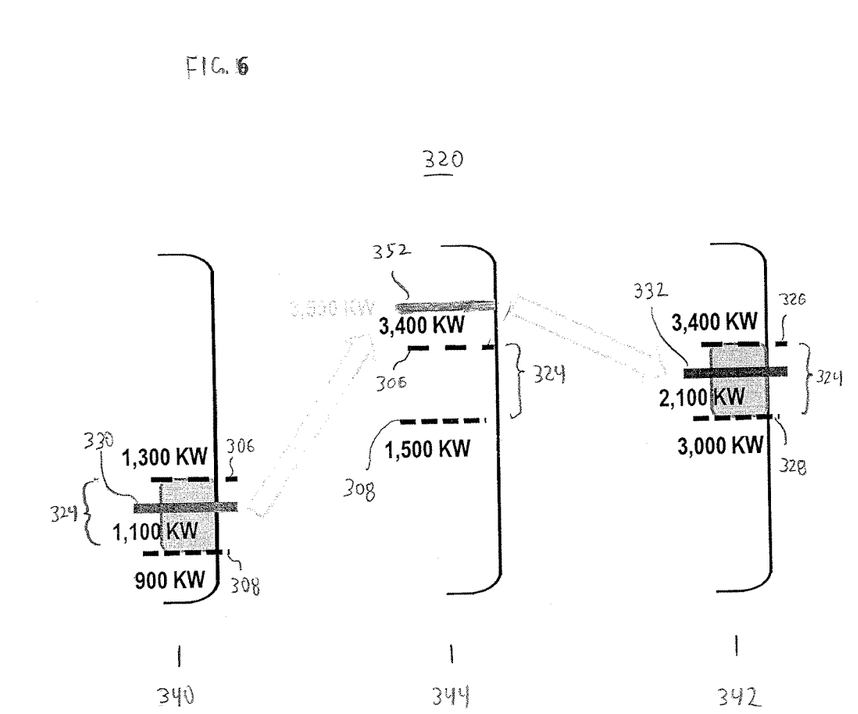
FIG. 6 is a schematic representation of a third embodiment of a method for distributing the electrical load among a plurality of gensets when the power demanded by the electrical load changes.

Referring to FIG. 6, there is illustrated a third method for accommodating the different response capabilities during a change in power demand. The third method also involves an interim condition in which the second operational range 324 is raised as directed by the dynamic power controller. To provide excess power during the lapse caused by the first genset 300 attempting to raise the first operational range 304 and first power target 310, the dynamic controller sets a new second power target 352 that may exceed the raised second operational range 324. For example, the new second power target 352 may exceed the upper threshold 326 of the second operational range 324 and, in an embodiment, may correspond to the power capacity limit of the second genset 320, for example 3500 KW. Being above the second operational range 324, the new second power target 352 may result in the least optimal operation for the second genset 320, and may stress or wear the second genset by operating it at or near its rated capacity. However, the interim condition with the new second power target 352 may also supply excess power, in kilowatts, intermittently, while the first genset 300 raises its first operational range 304 and its first power target 310. After the first genset 300 raises its settings, the dynamic power controller can lower the new second power target 352 to the level corresponding to the raised second power target 332 to resume efficient operation of the second genset 320. In various embodiments, the second genset 320 may be operated under droop mode during the interim condition to provide additional load sharing if necessary.

INDUSTRIAL APPLICABILITY

Figure 7:
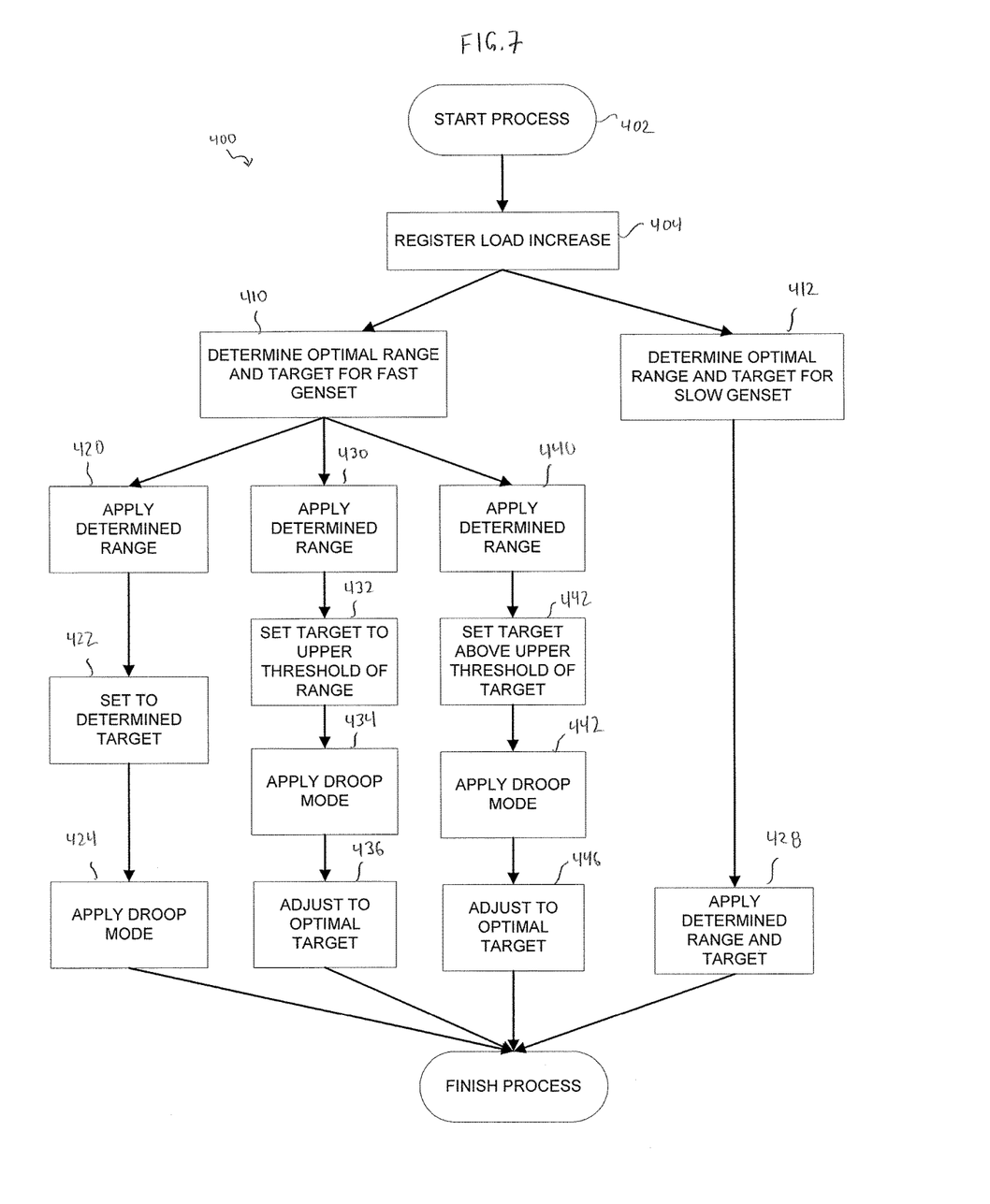
FIG. 7 is a flowchart illustrating possible routines for regulating operation of the plurality of gensets when the power demanded by an electrical load associated with the gensets changes.

The present disclosure is applicable to distributing an electrical load among a plurality of gensets that provide electrical power for an isolated load whose power demand may change or fluctuate. The processes and routines represented in flowchart 400 may be performed by any suitably configured electronic controller capable of communicating with and controlling the operation of one or more generator sets, or gensets. Referring to FIG. 7, there is illustrated a flowchart 400 for implementing various routines and methods for conducting various aspects of the disclosure. The flowchart 400 may begin with an initial step 402 in which a first genset having a slower response capability and a second genset having a faster response capability are operating in parallel to generate power for the power demand of the electrical load. In a registration step 404, the electronic controller associated with the flowchart may register an increase in the power demanded by the electrical load, for example, as may be caused by a device connecting into the electrical load.

In response to the registered increase in electrical load, the electronic controller in a first determination step 410 may determine a new optimal operational range and power target to apply to the faster genset. In a similar second determination step 412, the electronic controller may determine an operational range and a new power target to set for the slower genset. In accordance with an asymmetrical loading strategy, the determined operational range and power target may be calculated based on considerations concerning the prime mover portions of the faster and slower gensets, such as fuel efficiency and emissions. Because the response capability of the faster genset will cause it to raise the operational range and power target to the determined level before the slower genset can respond, the electronic controller can employ different methods to accommodate the effects the different response times may have on electrical generation.

According to a first method, the electronic controller may conduct an application step 420 in which the determined operational range is applied to the faster genset, thereby effectively raising the dynamic operating zone that the faster genset can operate in. The electronic controller can also perform a setting step 422 that resets the power target to the optimally determined level. The faster genset may generate power at the optimal power target within the operational range while the slower genset is raising its settings. To address the temporary deficiency of power generated by the faster and slower gensets compared to the increased load, the electronic controller can conduct a droop step 424 in which the faster genset is operated in droop mode to accommodate additional load that may be shed temporally from the slower genset. Droop mode may continue until the slower genset raises the optimal operational range and power target in a raising step 428.

According to a second method, the electronic controller may also conduct the application step 430 to apply the optimally determined operational range to the faster genset but may then conduct a setting set 432 that sets the power target above the optimally determined power target. For example, the setting step 432 may set the power target to the upper threshold of the operational range being applied to the faster genset. Although this setting may cause the faster genset to temporarily operate at efficiencies that are less than optimal, it may provide additional power output to compensate for the lag in response capability of the slower genset. If necessary, the electronic controller may also execute a droop step 434 to assume additional load from the slower genset. Once the slower genset raises the operational limit and the power target to the respective optimal determinations through the raising step 428, the controller may execute and adjustment step 436 to adjust the power target of the faster genset to the optimally determined level and resume efficient operation.

In the third method, the electronic controller again conducts the application step 440 to apply the optimally determined operational range to the faster genset. To provide additional power while the slower genset achieves its settings, the electronic controller may execute a setting step 442 to set the power target of the faster genset above the calculated optimal target and above the upper threshold of the operational range. Operation at this setting may be least efficient and may stress the faster genset, but can compensate for the power deficiency caused by the slower genset and its response capability. If necessary, the electronic controller may also conduct the droop step 444 to operate the faster genset in droop mode. After the slower genset has completed the raising step 428 and is operating at the determined optimal operational range and power target, the electronic controller may execute an adjustment step 446 to lower the power target of the faster genset below the upper threshold of the operational range and to the optimally determined power target.

Hence, a possible advantage of the disclosure is that it corrects for different capacity gensets with prime movers having different response capabilities during a change in the power demand from an electrical load. Another possible advantage is that the disclosure is that it facilitate an asymmetrical loading strategy among a plurality of gensets providing power for an isolated electrical load. These and other advantages should be apparent from the forgoing disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An electrical power system comprising:
   a common bus coupled with an electrical load;
   a first genset having a first power capacity limit connected to the common bus and associated with a first response capability to changes in the electrical load;
   a second genset having a second power capacity limit connected to the common bus and associated with a second response capability to changes in the electrical load, the second response capability being relatively slower than the first response capability; and
   an electronic controller configured i) to apply a first operational range to the first genset and to apply a second operational range to the second genset in response to changes in the electrical load, ii) to determine a first power target within the first operational range and to determine a second power target with the second operational range in response to changes in the electrical load; iii) to raise the first operational range within the first power capacity and to raise the second operational range within the second power capacity; iv) to set the first power target in accordance with the first response capability and set the second power target in accordance with the second response capability; and v) operating the first genset intermittently in an interim condition generating power in excess of the first power target as determined to accommodate the second response capability until the second power target is set in accordance with the second response capability.

2. The electrical power system of claim 1, wherein the electronic controller is further configured to intermittently set the first power target to an upper threshold of the first operational range during the interim condition prior to setting the first power target within the operational range.

3. The electrical power system of claim 1, wherein the electronic controller is further configured to intermittently set the first power target to above an upper threshold of the first operational range during the interim condition prior to setting the first power target within the operational range.

4. The electrical power system of claim 1, wherein the electronic controller is further configured to intermittently set the first power target to the first power capacity limit during the interim condition.

5. The electrical power system of claim 1, wherein the first genset operates in droop mode during the interim condition until the second power target is set within the second operational range.

6. The electrical power system of claim 1, wherein the first operational range and the second operational range are dynamic and quantitatively adjust when raised.

7. A method of operating a plurality of gensets comprising:
   connecting a first genset having a first power capacity limit and a second genset having a second power capacity limit to an electrical load, the first genset associated with a first response capability to changes in the electrical load that is faster than a second response capability associated with the second genset;
   applying a first operational range to a first genset and setting a first power target within the first operational range;
   applying a second operational range to the second genset and setting a second power target within the second operational range;
   raising the first operational range within the first power capacity limit and the second operational range within the second power capacity limit in response to a power request increase from the electrical load;
   setting the first power target according to the first response capability and setting the second power target according to the second response capability;
   and operating the first genset intermittently in an interim condition generating power in excess of the first power target to accommodate the second response capability until the second power target is set in accordance with the second response capability.

8. The method of claim 7, wherein the first power target is set within the first operational range as raised.

9. The method of claim 8, wherein the step of setting the first power target intermittently sets the first power target to an upper threshold of the first operational range as raised during the interim condition prior to setting the second power target within the second operational range.

10. The method of claim 9, further operating the first genset under a droop mode during the interim condition until the second power target is set.

11. The method of claim 7, wherein the step of setting the first power target intermittently sets the first power target to the first power capacity limit during the interim condition prior to resetting the second power target within the second operational range as raised.

12. The method of claim 11, further operating the first genset under a droop mode during the interim condition until the second power target is set.

13. An electrical power system comprising:
a first genset having a first power capacity limit and ability to operate within the first power capacity limit;
a second genset having a second power capacity limit and ability to operate within the second power capacity limit;
a common bus in electrical connection with the first genset and the second genset in a parallel arrangement, the common bus coupled with an electrical load;
an electronic controller communicating with the first genset and the second genset to allocate a power request from the electrical load as a first power target within a first operational range applied to the first genset and as a second power target within a second operational range applied to the second genset, the electronic controller configured to raise the first operational range at a first response capability and the second operational range at a second response capability in an event of an increase to the power request from the electrical load, the electronic controller further configured to set the first power target within the first power capacity limit while attempting to raise a second power target within the second operational range as raised, the electronic controller further configured to operate the first genset intermittently in an interim condition generating power in excess of the first power target to accommodate the second response capability until the second power target is set in accordance with the second response capability.

14. The electrical power system claim 13, wherein the first genset operates in a droop mode during the interim condition until raising of the second power target is accomplished.

15. The electrical power system of claim 13, wherein the electronic controller maintains the first power target after raising the second power target is accomplished.

16. The electrical power system of claim 13, wherein the first power target is set to an upper threshold of the first operational range as raised during the interim condition.

17. The electrical power system of claim 16, wherein the first power target is lowered after raising of the second power target is accomplished.

18. The electrical power system of claim 13, wherein the first power target is raised above an upper threshold of the first operation range as raised during the interim condition.

19. The electrical power system of claim 13, where in the first power target is raised to the first power capacity limit of the first genset during the interim condition.

20. The electrical power system of claim 13, wherein the first operational range and the second operational range are dynamic and quantitatively adjust when raised.

* * * * *